Oct. 16, 1956   A. W. FRENCH   2,766,636
MECHANICAL DRIVE
Filed Nov. 8, 1954

INVENTOR.
ALFRED W. FRENCH
BY
Marechal, Biebel, French & Bugg
ATTORNEYS

United States Patent Office 2,766,636
Patented Oct. 16, 1956

2,766,636

MECHANICAL DRIVE

Alfred W. French, Piqua, Ohio, assignor to The French Oil Mill Machinery Company, Piqua, Ohio, a corporation of Ohio Application November 8, 1954, Serial No. 467,253

18 Claims. (Cl. 74—325)

This invention relates to mechanical drives.

The invention has special relation to mechanical drives for machines which have a range of operating speeds but which commonly run at only one selected speed for a given operation or set of operating conditions rather than requiring changes of speed during operation. Thus, for example, in a machine such as a mechanical press of the screw type, it is desirable to be able to change the feed rate over a fairly wide range in accordance with the characteristics of the materials being processed therein, but such feed rate is ordinarily maintained effectively constant for a given material and treatment thereof. It is therefore satisfactory with such machines to be able to change the operating speed while the machine is at rest, but it is practically important that such change require as little time and labor as possible.

It is a primary object of the present invention to provide a mechanical drive suitable for uses such as outlined above which is simple and rugged in construction, which includes provision for changing the output speed thereof over a wide range while the drive is at rest, and which requires a minimum of parts and labor for effecting each such speed change.

A particular object of the invention is to provide such a mechanical drive wherein the speed change is effected by simple exchange of a drive pinion on the drive shaft of a drive motor and wherein provision is made for quickly and accurately adjusting the position of the motor to accommodate drive pinions of different sizes in accordance with the desired changed speed and without removing the motor from the machine, and it is also an object of the invention to provide such a drive wherein the drive pinion and its meshing drive gear are of the herringbone type and wherein the drive pinion is splined on the drive shaft and is thus quickly and easily slipped off the shaft for exchange when the shafts are adjusted to properly spaced positions.

An additional object of the invention is to provide a mechanical drive for a machine wherein the drive motor is supported on the frame of the machine by a mounting which incorporates means for shifting the position of the motor with respect to a driven gear in order to facilitate exchange of the driving pinion on the motor shaft without requiring external lifting or supporting means for the motor during changing of the pinion.

A further object of the invention is to provide a mechanical drive as outlined above wherein the adjusting movement of the motor with respect to the main frame of the machine is guided by cooperating parts on the motor support and the frame which also form parts of a clamping mechanism for firmly securing the motor to the frame in each selected adjusted position thereof and which may also incorporate if desired a locking means to lock the support against any movement under load and during use.

It is also an object of the invention to provide a mechanical drive as outlined above wherein the drive motor is supported on the main frame of the machine by an adjustable mounting which incorporates parts for raising and lowering the motor free of external means and which also is adapted for cooperation with simple gauge members forming stops establishing the proper adjusted position of the motor for each selected size of drive pinion.

Other objects and advantages of the invention will be apparent from the following description, the accompanying drawing and the appended claims.

In the drawing—

Figure 1:
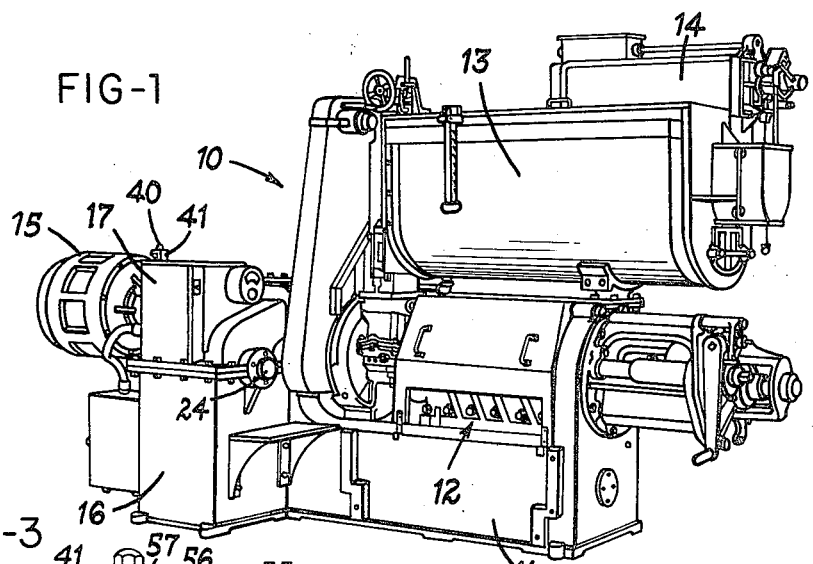
Fig. 1 is a perspective view of a screw press provided with a mechanical drive constructed in accordance with the invention.
Figure 3:
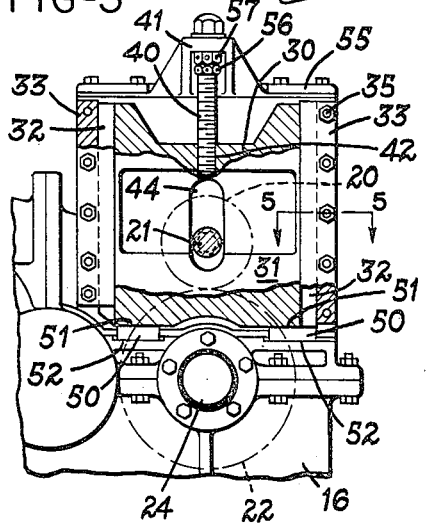
Fig. 3 is a view looking from left to right in Fig. 2 with most of the motor support broken away on the line 3—3 of Fig. 4.
Figure 2:
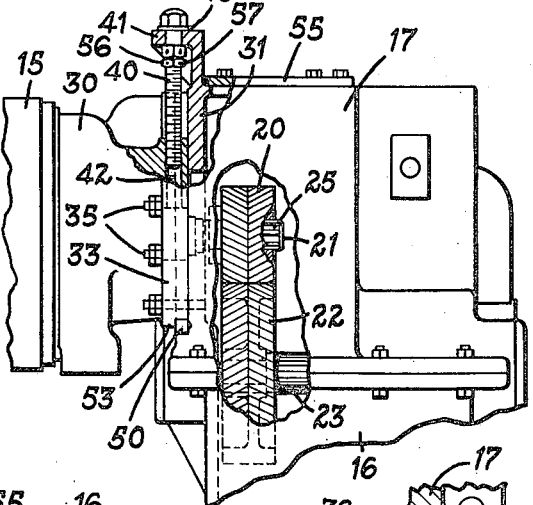
Fig. 2 is a fragmentary view in front elevation of the housing for the drive in Fig. 1, with parts broken away approximately in section on the line 2—2 of Fig. 4.
Figure 4:
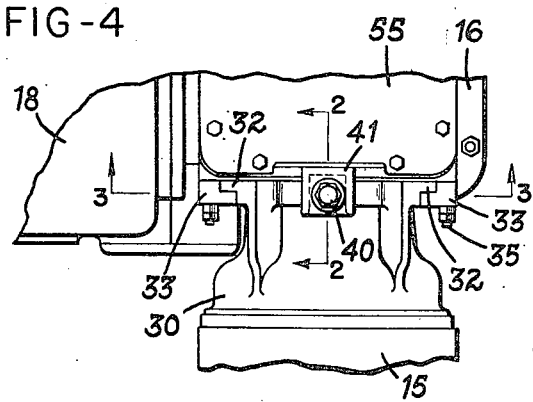
Fig. 4 is a view looking downwardly in Figs. 2 and 3.
Figure 5:
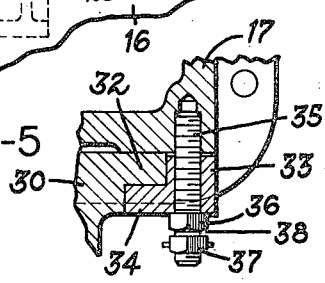
Fig. 5 is an enlarged fragmentary section on the line 5—5 of Fig. 3.

Referring to the drawing, which illustrates a preferred embodiment of the invention, Fig. 1 shows a mechanical screw press indicated generally at 10 and including a main base housing 11 supporting the cage 12, tempering bin 13 and feed hopper 14. The drive motor 15 for supplying the main operating power to the several sections of the press drives through a transmission mounted in an extension portion 16 of the main frame having gear case covers 17 and 18 which cooperate with the frame portion 16 to form the housing for the transmission. The direct driving connection between the motor and transmission is provided by a drive pinion 20 on the motor drive shaft 21 which meshes with a driven gear 22 on a driven shaft 23 supported on the frame portion 16 and cover 17 by the bearing assemblies indicated generally at 24. The gear 22 and pinion 20 are shown as of the herringbone type, and the pinion 20 is mounted on the drive shaft 21 by a simple splined connection as indicated at 25.

In accordance with the invention, changes in the speed of the press are effected by exchanging the drive pinion 20, namely by utilizing a selected pinion 20 of the desired number of teeth in accordance with the desired reduction in speed from shaft 21 to shaft 23. Since variation in the number of teeth between two such pinions causes variation in the pinion diameters, it is necessary when exchanging pinions to adjust the relative spacing of the shafts 21 and 23 for proper meshing of the selected pinion with the driven gear 22. Accordingly, the invention provides means for quickly and accurately adjusting the position of the motor 25 with respect to driven shaft 23 in accordance with the size of the selected pinion 20 to be used and without removing the motor from the machine.

The motor 25 has an end bell 30 of special construction by means of which it is directly supported on the outer wall 31 of the gear case cover 17. In addition to carrying the normal bearing for the motor shaft the bell 30 is formed at either side of its end wall with a laterally projecting flange 32, and these flanges fit in slidable relation between a pair of guide members 33 which includes flange portions 34 overlapping the flanges 32. The guide members 33 are mounted on the gear cover 17 by bolts 35 provided with clamping nuts 36 and castle nuts 37. The nuts 36 and 37 are adjusted to provide a slight clearance as indicated at 38 when the nuts 36 are tightened to clamp the support flanges 32 in fixed relation with the cover 17, but when the nuts 36 are loosened, the support 30 can be moved in guided relation with the parts 33 in the plane normal to the axes of the drive and driven shafts. This structure thus forms a releasable means for securing the motor and its support to the frame in any adjusted position thereof.

The mounting for the motor support 30 also includes means built into the unit for controlled raising and lowering of the motor without requiring external lifting or supporting means. As shown, a jackscrew 40 is journaled in an overhanging extension 41 at the top of the gear case cover wall 31, and the lower end of this jackscrew is threaded in a suitable tapped bore 42 in the end wall of the support bell 30. It will thus be seen that when the clamp nuts 36 are released, rotation of jackscrew 40 will produce corresponding vertical movement of the motor 15 and its drive shaft 21 in the plane as defined, and the end wall 31 is accordingly provided with a vertically arranged slot 44 through which the drive shaft 21 projects and which thus allows for vertical adjusting movement of the motor and drive shaft. The head of jackscrew 40 is shown as provided with a suitable bearing washer 45 facilitating rotation thereof.

Means are provided in accordance with the invention for accurately gauging and establishing the proper adjusted position of the motor for each selected drive pinion 20. Such gauge means are shown as a pair of blocks 50 received between the lower end surfaces 51 of the flanges 32 and shelf portion 52 on the gear case cover 17 forming upwardly facing abutments. A separate pair of gauge blocks 50 is provided for each pinion 20 in the proper size to stop downward movement of the motor when its drive shaft 21 is in the proper spaced relation with driven shaft 22 for the associated selected pinion. It will be noted that the gauge blocks 50 may be readily removed and replaced when the motor structure is raised, but when it is lowered, lips 53 on the bottom of flanges 32 fit over and lock the blocks securely in place. The structure thus constitutes a rigid but adjustable separating means for the two shafts which is variable in accordance with the size of the drive pinion.

When it is desired to change the speed of the drive, it is then only necessary to select the appropriate pinion 20, loosen the nuts 36, and then rotate the jackscrew 40 in the direction to raise the motor until the pinion 20 which is then in use is out of engagement with the drive gear 22. The cover plate 55 on the gear case cover 17 is then temporarily removed to permit the operator to slip the pinion 20 off the drive shaft and to replace it by the selected new pinion. The proper gauge blocks 50 are then set on the abutments 52, and the jackscrew 40 is rotated in the opposite direction to lower the motor until the abutment surfaces 51 and 53 seat on the gauge blocks. Nuts 36 may then be retightened, and the drive is ready for use without removal of the motor or its drive shaft and without requiring external power or mechanism to raise or lower the motor.

In operation, the motor is firmly locked in the proper position for driving engagement between the pinion 20 and gear 22, since the motor is first definitely located as described by means of the gauge blocks 50, and it is then held in that position both by the jackscrew 40 and also especially by the clamping action of the guide members 33 on the side flange 32 of the end bell 30. In addition, means are provided for further locking the motor in place by a thrust applied through the jackscrew. This is accomplished by means of a jam nut 56 and above it an ordinary hex nut 57 both on jackscrew 40. Thus by properly settling these nuts and then rotating the jackscrew, a downward thrust may be applied to the jackscrew which further locks the motor in place by the resulting pressure against the gauge blocks.

This drive is accordingly of simple construction, and it offers a variety of practical advantages including change in the operating speed of the machine over a wide range by mere exchange of drive pinions. For example, in one drive arrangement with which satisfactory results have been obtained, the driven gear 22 has 122 teeth and the remainder of the transmission is effective to reduce the 1800 R. P. M. speed of the motor shaft 21 to a speed of 14 R. P. M. for the main feed screw shaft of the press utilizing a drive pinion 20 having 30 teeth. This operating speed for the main shaft is increased to 40 R. P. M. utilizing a drive pinion having 86 teeth, and intermediate speeds in the range of from 14 to 40 R. P. M. are obtained with drive pinions of appropriately intermediate numbers of teeth. In another similar drive, utilizing a driven gear 22 having 108 teeth, by selecting a drive pinion having from 44 to 100 teeth, the speed of the main shaft is varied from 23 to 53 R. P. M., respectively.

The use of herringbone pinions and gears as shown offers special advantages for the purposes of the invention. Since such gear members are held in axially fixed relation by their intermeshing action, it is not necessary to secure the drive pinion on the motor shaft by pressing on, lock collars or the like as in the case of other types of gear members, and it is therefore possible to employ the simple spline arrangement as described which permits the pinions to be slipped on and off the drive shaft by hand by way of a convenient cover plate and without undue effort. The invention thus minimizes both the required effort and the possibility of loss or inadvertent mislaying of parts, and this result is also aided by the jackscrew supporting arrangement for the motor and its guiding and supporting members since all such adjustments are possible with the construction of the invention without removing the relatively heavy motor assembly or any of the parts from the machine, and without requiring external lifting or supporting equipment.

While the forms of apparatus herein described constitute preferred embodiments of the invention, it is to be understood that the invention is not limited to those precise forms of apparatus, and that changes may be made therein without departing from the scope of the invention which is defined in the appended claims.

What is claimed is:

1. In a drive including a driven gear on a driven shaft adapted to mesh with a drive pinion on a drive shaft, the combination of a fixed frame, bearing means on said frame supporting said driven shaft, a supporting plate, a drive motor carried on said plate and coupled with said drive shaft, means forming an adjustable connection between said supporting plate and said frame providing for adjustment of said plate with respect to said frame in a plane normal to the axis of said shafts to vary the spacing of said drive shaft and motor with respect to said driven shaft and correspondingly to provide for separately mounting selected drive pinions of different sizes on said drive shaft in mesh with said gear, and means for securing said supporting plate to said frame in each selected adjusted position thereof.

2. In a drive including a driven gear on a driven shaft adapted to mesh with a drive pinion on a drive shaft, the combination of a fixed frame, bearing means on said frame supporting said driven shaft, a supporting plate, a drive motor carried on said plate and coupled with said drive shaft, means forming an adjustable connection between said supporting plate and said frame providing for adjustment of said plate with respect to said frame in a plane normal to the axis of said shafts to vary the spacing of said drive shaft and motor with respect to said driven shaft and correspondingly to provide for separately mounting selected drive pinions of different sizes on said drive shaft in mesh with said gear, and gauge means cooperating with said supporting plate and said frame to establish the proper adjusted position of said plate in accordance with the size of a selected drive pinion for said drive shaft.

3. In a drive including a drive shaft having a drive pinion adapted to mesh with a driven gear on a driven shaft, the combination of a frame including means supporting said driven shaft and gear, a support for said drive shaft including a slidable plate, adjustable means mounting said slidable plate on said frame for adjusting movement in a plane extending transversely of the axes of said shafts to vary the spacing of said shafts with respect to each other and correspondingly to provide for separately mounting selected drive pinions of different sizes on said drive shaft in mesh with said gear, said adjustable means including means supporting said plate on said frame in all adjusted positions of said plate for exchange of said drive pinion thereon without removal of said plate from said frames, and means for maintaining said plate in guided relation in said plane during said adjusting movements.

4. In a drive including a drive shaft having a drive pinion adapted to mesh with a driven gear on a driven shaft, the combination of a frame including means supporting said driven shaft and gear, a support for said drive shaft including a slidable plate, adjustable means mounting said slidable plate on said frame for adjusting movement in a plane extending transversely of the axes of said shafts to vary the spacing of said shafts with respect to each other and correspondingly to provide for separately mounting selected drive pinions of different sizes on said drive shaft in mesh with said gear, means for maintaining said plate in guided relation in said plane during said adjusting movements, gauge means cooperating with said plate and said frame to establish the proper adjusted position of said plate in accordance with the size of a selected drive pinion for said drive shaft, and releasable means for securing said plate against said frame in each adjusted position thereof.

5. In a drive including a driven gear adapted to mesh with a drive pinion on the drive shaft of a drive motor, the combination of a frame including means supporting said driven gear, an end bell for said drive motor having laterally projecting guide members formed thereon, cooperating guide means on said frame forming a guideway for movement of said guide members and said motor with respect to said frame in the plane normal to the axes of said shaft and said gear to provide for varying the spacing of said shaft with respect to said gear axis and correspondingly to provide for separately mounting selected drive pinions of different sizes on said shaft in mesh with said gear, and means connected between said guide members and said frame for effecting controlled movement of said guide members in said plane along said guideway.

6. In a drive including a driven gear adapted to mesh with a drive pinion on the drive shaft of a drive motor, the combination of a frame including means supporting said driven gear, an end bell for said drive motor having laterally projecting guide members formed thereon, cooperating guide means on said frame forming a guideway for movement of said guide members and said motor with respect to said frame in the plane normal to the axes of said shaft and said gear to provide for varying the spacing of said shaft with respect to said gear axis and correspondingly to provide for separately mounting selected drive pinions of different sizes on said shaft in mesh with said gear, means connected between said guide members and said frame for effecting controlled movement of said guide members in said plane along said guideway, and releasable means for securing said guide members to said frame in each adjusted position thereof.

7. In a drive including a driven gear adapted to mesh with a drive pinion on the drive shaft of a drive motor, the combination of a fixed frame including means supporting said driven gear, guide members carried on the frame of said drive motor, means including a jackscrew suspending said drive motor on said fixed frame for adjusting movement in response to rotation of said jackscrew, and means on said fixed frame for guiding said adjusting movement of said drive motor and its guide members in the plane normal to the axes of said shaft and said gear to vary the spacing of said shaft with respect to said gear axis and correspondingly to provide for separately mounting selected drive pinions of different sizes on said shaft in mesh with said gear.

8. In a drive including a driven gear adapted to mesh with a drive pinion of the drive shaft of a drive motor, the combination of a frame including means supporting said driven gear, oppositely projecting flange portions on said drive motor, guide members on said frame spaced to receive said flange portions therebetween for guided adjusting movement of said drive motor with respect to said frame, said guide members extending in the plane normal to the axes of said shaft and said gear to confine the movement of said drive motor with respect to said frame to vary the spacing of said shaft with respect to said gear axis and correspondingly to provide for separately mounting selected drive pinions of different sizes on said shaft in mesh with said gear, and removable rigid separating means between said drive motor and said frame of proper predetermined size for determining the spacing of said pinion from said gear for proper meshing operation.

9. In a drive including a driven gear adapted to mesh with a drive pinion of the drive shaft of a drive motor, the combination of a frame including means supporting said driven gear, oppositely projecting flange portions on said drive motor, guide members on said frame spaced to receive said flange portions therebetween for guided adjusting movement of said drive motor with respect to said frame, said guide members extending in the plane normal to the axes of said shaft and said gear to confine the movement of said drive motor with respect to said frame to vary the spacing of said shaft with respect to said gear axis and correspondingly to provide for separately mounting selected drive pinions of different sizes on said shaft in mesh with said gear, removable rigid separating mesh means between said drive motor and said frame of proper predetermined size for determining the spacing of said pinion from said gear for proper meshing operation, means for urging said motor against said separating means to fix the adjusted position thereof, and means for clamping said motor to said frame in the direction of said shaft in each said adjusted position thereof.

10. A drive comprising a driven shaft, a frame supporting said driven shaft, a herringbone gear on said driven shaft, a splined drive shaft, a herringbone pinion splined on said drive shaft, a support for said drive shaft, means forming an adjustable connection between said support and said frame providing for adjustment of said support with respect to said frame transversely of said driven shaft to vary the radial spacing of said shafts and correspondingly to provide for movement of said herringbone pinion out of mesh with said herringbone gear to release said pinion for removal thereof from said drive shaft, means on said frame maintaining said plate in guided relation with said driven shaft in all moved positions of said plate for removal of said herringbone pinion therefrom and replacement by a selected herringbone pinion of a different size followed by return movement of said plate to a position of meshing engagement of said replaced herringbone pinion with said herringbone gear, and means for securing said support to said frame in each adjusted position thereof.

11. A drive comprising a driven shaft, a frame supporting said driven shaft, a herringbone gear on said driven shaft, a drive motor having a splined drive shaft, a herringbone pinion splined on said drive shaft, a support for said drive motor, means forming an adjustable mounting for said support on said frame providing for adjustment of said support with respect to said frame transversely of said driven shaft to vary the radial spacing of said shafts and correspondingly to provide for movement of said herringbone pinion out of mesh with said herringbone gear to release said pinion for removal thereof from said drive shaft, means on said frame maintaining said plate in guided relation with said driven shaft in all moved positions of said plate for removal of said herringbone pinion therefrom and replacement by a selected herringbone pinion of a different size followed by return movement of said plate to a position of meshing engagement of said replaced herringbone pinion with said herringbone gear, and means for securing said support in fixed relation with said frame in each adjusted position thereof.

12. A drive comprising a driven shaft, a frame supporting said driven shaft, a herringbone gear on said driven shaft, a splined drive shaft, a herringbone pinion splined on said drive shaft, a support for said drive shaft, means forming an adjustable connection between said support and said frame providing for adjustment of said support with respect to said frame radially of said driven shaft to vary the radial spacing of said shafts and correspondingly to provide for separately mounting selected herringbone pinions of different sizes on said drive shaft in mesh with said gear, abutments facing each other on said frame and said support for relative movement with the adjusting movement of said support, and gauge means receivable between said abutments for engagement therewith to establish the proper adjusted position of said support in accordance with the size of a selected pinion on said drive shaft.

13. A drive comprising a driven shaft, a herringbone gear on said drive shaft, a housing supporting said shaft and gear, said housing having a slot in one wall thereof extending transversely of said driven shaft, a drive motor having a splined drive shaft, a support for said motor, means mounting said support on said housing with said drive shaft extending through said slot, a herringbone pinion splined on said drive shaft, cooperating means on said housing and said support for adjusting said support on said housing in line with said slot to vary the radial spacing of said shafts and correspondingly to move said herringbone pinion out of mesh with said herringbone gear, and means forming an access opening in said housing for manual replacement of said pinion by a pinion of a selected different size while said support is maintained on said housing by said adjusting means, said adjusting means being operable to move said support toward said driven shaft following replacement of said pinion to effect meshing engagement of said replaced pinion with said herringbone gear.

14. A drive comprising a driven shaft, a herringbone gear on said drive shaft, a housing supporting said shaft and gear, said housing having a slot in one wall thereof extending radially of said driven shaft, a drive motor having a splined drive shaft, a support for said motor, means mounting said support on said housing with said drive shaft extending through said slot, a herringbone pinion splined on said drive shaft, cooperating means on said housing and said support for adjusting said support in line with said slot to vary the radial spacing of said shafts and correspondingly to provide for separately mounting selected herringbone pinions of different sizes on said drive shaft in mesh with said gear, means forming an access opening in said housing for manual replacement of said pinion, abutments facing each other on said support and said housing for relative movement with the adjusting movement of said support, gauge means receivable between said abutments for engagement therewith to establish the proper adjusted position of said support in accordance with the size of a selected said pinion on said drive shaft, and means for locking said support in fixed relation against said gauge means to assure continuing engagement of said pinion with said gear under load.

15. A drive comprising a driven shaft, a herringbone gear on said drive shaft, a housing supporting said shaft and gear, said housing having a vertical slot in one wall thereof extending radially of said driven shaft, a drive motor having a splined drive shaft, a herringbone pinion splined on said drive shaft, a support for said motor, means suspending said support on said housing with said drive shaft extending through said slot and including adjustable means connected to said housing and said support for raising and lowering said support in line with said slot to vary the radial spacing of said shafts and correspondingly to provide for separately mounting selected herringbone pinions of different sizes on said drive shaft while maintaining said support in a moved position with relation to said driven shaft followed by return movement of said support to a position of meshing engagement of said pinion with said gear, means forming an access opening in said housing for manual replacement of said pinion in said moved position of said support, and means for securing said support to said housing in each adjusted position thereof.

16. In a drive including a driven gear adapted to mesh with a drive pinion on the drive shaft of a drive motor, the combination of a frame including means supporting said driven gear, a support for said drive motor, a jackscrew connecting said support with said frame for adjusting movement in response to rotation of said jackscrew, said jackscrew extending transversely of said drive shaft to maintain said motor in definite relation with said frame while varying the spacing of said shaft with respect to said gear axis to provide for separately mounting selected drive pinions of different sizes on said shaft in mesh with said gear, a pair of oppositely projecting flanges on said support substantially parallel with said jackscrew, guide members on said frame spaced to receive said flanges therebetween for guiding said adjusting movement of said support with respect to said frame, said guide members extending substantially parallel with said jackscrew to maintain said support in guided relation with said frame and the axis of said gear, said guide members including flange portions overlapping said flanges on said support, and releasable means for securing said flange portions of said guide members in clamping relation with said flanges and said frame to fix the position of said motor with respect to said gear axis in each adjusted position thereof.

17. In a drive including a driven gear adapted to mesh with a drive pinion on the drive shaft of a drive motor, the combination of a frame including means supporting said driven gear, a support for said drive motor, a jackscrew connecting said support with said frame for adjusting movement in response to rotation of said jackscrew, said jackscrew extending transversely of said drive shaft to maintain said motor in definite relation with said frame while varying the spacing of said shaft with respect to said gear axis to provide for separately mounting selected drive pinions of different sizes on said shaft in mesh with said gear, a pair of oppositely projecting flanges on said support substantially parallel with said jackscrew, guide members on said frame spaced to receive said flanges therebetween for guiding said adjusting movement of said support with respect to said frame, said guide members extending substantially parallel with said jackscrew to maintain said support in guided relation with said frame and the axis of said gear, said guide members including flange portions overlapping said flanges on said support, releasable means for securing said flange portions of said guide members in clamping relation with said flanges and said frame to fix the position of said motor with respect to said gear axis in each adjusted position thereof, and gauge block removably receivable between portions of said support and said frame to fix the adjusted position of said motor in accordance with a selected said drive pinion.

18. In a drive including a driven gear adapted to mesh with a drive pinion on the drive shaft of a drive motor, the combination of a frame including means supporting said driven gear, a support for said drive motor, a jackscrew connecting said support with said frame for adjusting movement in response to rotation of said jackscrew, said jackscrew extending transversely of said drive shaft to maintain said motor in definite relation with said frame while varying the spacing of said shaft with respect to said gear axis to provide for separately mounting selected drive pinions of different sizes on said shaft in mesh with said gear, a pair of oppositely projecting flanges on said support substantially parallel with said jackscrew, guide members on said frame spaced to reecive said flanges therebetween for guiding said adjusting movement of said support with respect to said frame, said guide members extending substantially parallel with said jackscrew to maintain said support in guided relation with said frame and the axis of said gear, said guide members including flange portions overlapping said flanges on said support, releasable means for securing said flange portions of said guide members in clamping relation with said flanges and said frame to fix the position of said motor with respect to said gear axis in each adjusted position thereof, a gauge block removably receivable between portions of said support and said frame on the opposite side of said motor from said jackscrew, and means for operating said jackscrew to urge said support against said gauge block to fix the adjusted position of said motor in accordance with a selected said drive pinion.

References Cited in the file of this patent

UNITED STATES PATENTS

| | | |
|---|---|---|
| 1,657,245 | Day | Jan. 24, 1928 |
| 2,436,746 | Drought | Feb. 24, 1948 |
| 2,590,675 | Bottorff | Mar. 25, 1952 |